Figure 1:
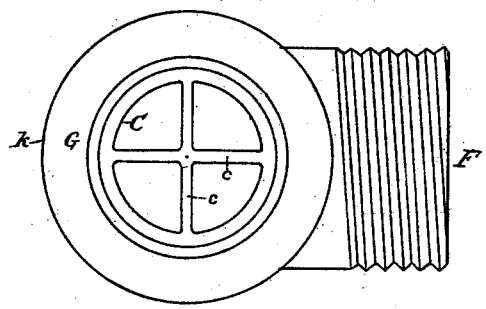
Figure 2:
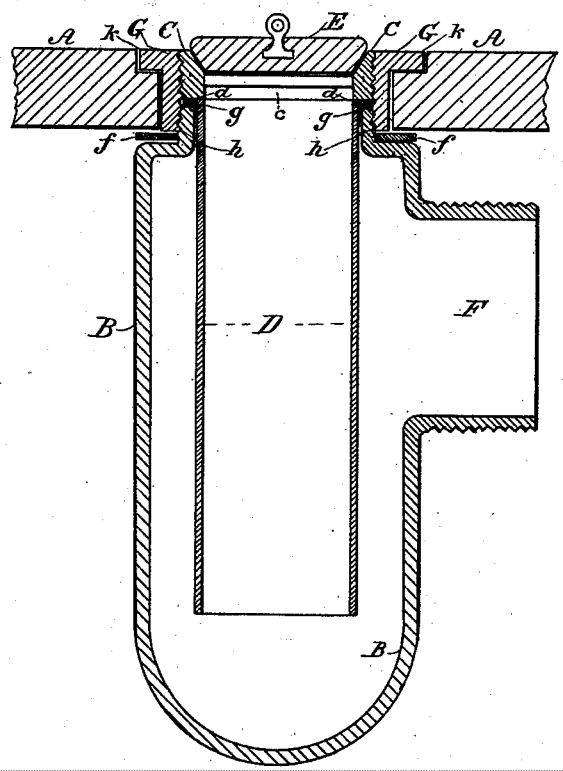

No. 665,926. Patented Jan. 15, 1901.
A. O'BRIEN.
SANITARY APPLIANCE.
(Application filed Aug. 5, 1898.)

(No Model.)

Witnesses
Charles W. Helmich
[signature]

Arthur O'Brien Inventor.
per Edward [signature]
Attorney.

UNITED STATES PATENT OFFICE.

ARTHUR O'BRIEN, OF HELENA, MONTANA, ASSIGNOR OF ONE-FOURTH TO MARTIN A. MITCHELL, OF SAME PLACE.

SANITARY APPLIANCE.

SPECIFICATION forming part of Letters Patent No. 665,926, dated January 15, 1901.

Application filed August 5, 1898. Serial No. 687,797. (No model.)

*To all whom it may concern:*

Be it known that I, ARTHUR O'BRIEN, a citizen of the United States of America, and a resident of the city of Helena, county of Lewis and Clarke, State of Montana, have invented certain new and useful Improvements in Sanitary Appliances, of which the following is a specification.

My invention relates to the sanitary appliances commonly known as "traps" and to the method of attaching them to the fixtures, such as sinks, bowls, bath-tubs, and the like. Its merit lies in its simplicity, the small number of parts, cheapness of construction, and easy accessibility for cleansing.

In the accompanying drawings, Figure I represents a plan view of my invention with the stopper removed. Fig. II shows a side elevation in section.

Similar letters refer to similar parts in both views.

A is the fixture, bowl, sink, bath-tub, or the like.

G is a ring having a flange $k$ and threaded on the inside.

B is the trap-cylinder, closed at its lower end, having the threaded discharge orifice or pipe F, and contracted and threaded at its upper end at $h$ to screw into the ring G.

D is the trap-pipe, having the narrow flange $d$.

C is the follower, having the cross-bars $c\ c$ and threaded on the outside to screw into the ring G.

E is the stopper.

$f$ and $g$ are washers of rubber or other suitable material.

Having thus described the various parts, the construction and action are evident. The rings G are made of various sizes to fit the outlets of various-sized fixtures and can thus be quickly fitted to any fixture. Thus the ordinary coupling and lock-nut are done away with, the ring forming the single connection between the trap and the fixture. The joint of the ring G with the fixture A is sealed in the ordinary way with white lead or putty, and when the trap-cylinder B is screwed into the ring G, compressing the washer $f$ between the shoulder of the trap-cylinder B and the bottom of the fixture A, the joint is made perfectly tight. The trap-pipe D is then placed within the trap-cylinder, its flange $d$ finding a seat on the washer $g$ on the upper edge of the trap-cylinder B. The follower C is screwed to its place, making the joint tight at $d$. The usual sealing against sewer-gas is accomplished in the usual way by the water rising in the trap-cylinder and trap-pipe to the lower edge of the discharge-pipe F.

In this invention the least possible space for the accumulation of gases between the surface of the sealing-water and the orifice of the fixture is secured and a more or less complicated arrangement of couplings and nuts is avoided. The cleaning of the trap is simplicity itself. The follower C is unscrewed and the trap-pipe withdrawn, when the whole trap is open for cleaning and inspection. In case of corrosion or injury of the trap-pipe, a new one is readily inserted at a minimum of cost and labor as compared with present methods.

I do not confine myself to the particular form of trap-cylinder shown nor to the particular method of securing the trap-pipe shown. The follower and trap-pipe may be in one piece, thus lessening the number of parts and simplifying their removal and cleansing.

Having thus described my invention, what I claim as new, and desire to secure by Letters Patent, is—

1. The combination with the fixture of a sanitary appliance forming a combined trap and connection, consisting of a ring having a top flange outside and threaded inside, a trap-cylinder having a discharge-pipe and threaded outside at its upper end, a trap-pipe having a flange and a screw-ring at the upper end thereof to hold the flange of the trap-pipe to bear upon the top of the trap-cylinder substantially as described.

2. The combination with the fixture of a sanitary appliance forming a combined trap-pipe and connection, consisting of a ring having a top flange outside and threaded inside and fitted to the fixture, a trap-cylinder having a discharge-pipe, threaded outside at its upper end to fit within the ring and having a shoulder between the threaded end and the discharge-pipe to bear beneath the ring and fixture, a packing ring or washer between the shoulder and the fixture, and a trap-pipe having an outer flange at its upper end to bear upon the top of the trap-cylinder substantially as described.

Signed by me at Helena, Montana, this 30th day of July, 1898.

ARTHUR O'BRIEN.

Witnesses:
EDWARD C. RUSSEL,
CHARLES W. HELMICK.